United States Patent [19]

Fauteux et al.

[11] Patent Number: 5,434,021
[45] Date of Patent: Jul. 18, 1995

[54] SECONDARY ELECTROLYTIC CELL AND ELECTROLYTIC PROCESS

[75] Inventors: Denis G. Fauteux, Acton; Martin Van Buren, Chelmsford; Jie Shi, Arlington; Mehmet Rona, Cambridge, all of Mass.

[73] Assignee: Arthur D. Little, Inc., Cambridge, Mass.

[21] Appl. No.: 290,017

[22] Filed: Aug. 12, 1994

[51] Int. Cl.⁶ .................. H01M 10/12; H01M 4/60
[52] U.S. Cl. ................................. 429/213; 429/216
[58] Field of Search ..................... 429/216, 212, 213

[56] References Cited

U.S. PATENT DOCUMENTS

| | | | |
|---|---|---|---|
| 4,496,638 | 1/1985 | Sugiuchi et al. | 429/192 |
| 4,812,375 | 3/1989 | Foster | 429/101 |
| 5,162,178 | 11/1992 | Ohsawa | 429/218 |
| 5,342,710 | 8/1994 | Koksbang | 429/192 |
| 5,387,482 | 2/1995 | Anani | 429/191 |

FOREIGN PATENT DOCUMENTS 06029043 2/1994 Japan .

OTHER PUBLICATIONS

Three Abstracts from the "Seventh International Meeting on Lithium Batteries" held May 15-20, 1994, Numbered 1-3 hereinbelow: 1. The Morphology Change of Lithium Surface Immersed in Nonaqueous Solvents and the Modification of Lithium Surface (pp. 37-41), Z. Takehara; 2. Vapor-Deposited Thin Film Polymer Electrolytes For Lithium Batteries (pp. 89-91), Z. Ogumi, Y. Uchimoto and Z. Takehara; 3. Rechargeable Lithium Batteries for Stationary and Electronic Vehicles Applications (pp. 181-185), X. Takehara.

The Formation of Thin Polymer Films in The Gas Discharge, Mar., 1960, Jerome Goodman.

Organic Polymer Coating From a Gas Discharge, Mar., 1970, Arthur Bradley.

*Primary Examiner*—John Niebling
*Assistant Examiner*—Brendan Mee
*Attorney, Agent, or Firm*—Dick and Harris

[57] ABSTRACT

An electrolytic cell and electrolytic process wherein the cell includes a metal anode (such as a lithium anode), a cathode and an electrolyte. A surface layer which is applied to the metal anode enables transfer of ions from the metal anode to the electrolyte and thus allows the ions to pass back into contact with the metal anode. The surface layer is also electronically conductive so that the ions will be uniformally attracted back onto the metal anode during electrodeposition to, in turn, substantially suppress dendrite growth and, in turn, substantially increase the cycle life of the cell.

20 Claims, 2 Drawing Sheets

SECONDARY ELECTROLYTIC CELL AND ELECTROLYTIC PROCESS

BACKGROUND OF THE INVENTION

1. Field of the Invention

The present invention relates in general to secondary cells and, more particularly, to an electrolytic cell and electrolytic process associated therewith, wherein dendrite growth during electrodeposition is substantially suppressed to, in turn, substantially increase the cycle life of the cell.

2. Background Art

Rechargeable, or secondary electrolytic cells, have been known in the art for many, many years. Furthermore, secondary cells constructed with lithium anodes have likewise been known in the art. Although such lithium rechargeable batteries have proven to be functional, they have been undesirable for use from a practical standpoint. Indeed, it is well known that the cycle life of such rechargeable lithium batteries are cut relatively short (compared to other types of secondary cells such as nickel-cadmium) due to the formation of dendritic growth on the working electrode during electrodeposition—wherein such dendrites typically facilitate the loss of electrochemical activity within the cell and/or internal shorting therewithin.

In an attempt to suppress such dendritic growth, various approaches have been pursued, including the utilization of an ionically conductive organic film which is deposited on the anode through a plasma polymerization process. Although such organic films have indeed exhibited ionic conductivity, they have not exhibited any detectable electronic conductivity—toward substantial uniform attraction and deposition of, for example, lithium metal ions back on the anode during electrodeposition.

Accordingly, while the prior art attempts to develop an organic surface layer which (when applied to the working electrode, and, more particularly, a lithium anode, of an electrolytic cell) will suppress dendrite growth on the working electrode during electrodeposition, the results have been less than satisfactory. Indeed, although such prior art organic films have represented a step in the right direction, none of such prior art, alone, or in combination with each other, teach, much less suggest, the utilization of a surface layer which is both ionically conductive and electronically conductive—wherein such electronic conductivity facilitates a substantially uniform attraction of the particular alkali metal ions (such as lithium ions) of the working electrode (such as a lithium anode) back through the surface layer and onto the anode during electrodeposition toward substantial suppression of dendrite growth on the anode. In addition, none of such prior art references teach, much less suggest such a surface layer which further exhibits substantial chemical equilibrium between the surface layer and the particular alkali metal electrode toward still further suppression of dendrite growth to, in turn, greatly increase the cycle life of the secondary electrolytic cell.

SUMMARY OF THE INVENTION

The present invention comprises an electrolytic cell (or rechargeable battery) having an anode, cathode and an electrolyte. A surface layer having means for enabling transfer of ions from the anode to the electrolyte and back into contact with the anode and for providing electronic conductivity in the surface layer is applied to the interface of the anode by conventional techniques. As will be explained, such electronic conductivity will result upon the formation of radical anions upon contact of the surface layer with the anode to, in turn, disperse an electrical field at the anode (electrode)/electrolyte interface. Such an electrical field will thus serve to uniformly attract ions, previously dispersed into the electrolyte, back through the surface layer and into contact with the anode toward a substantially uniform distribution of metal ions on the anode during electrodeposition. Accordingly, such uniform attraction will thereby substantially suppress dendrite growth on the anode, (which would otherwise occur during reduction) and, in turn, will substantially increase the cycle life of the secondary cell.

In a preferred embodiment of the invention, the electrolytic cell o further comprises means for substantially obtaining chemical equilibrium between the surface layer and the anode. In addition, the anode may be substantially constructed from an alkali metal, such as lithium, and the surface layer applied to the anode may include a polymer comprising vinylnaphthalene—although any other type of polynuclear aromatic structure which will form radical anions upon contact with the anode is also contemplated for use; and, polyethylene oxide—although other compounds which facilitate ionic conductivity in the electrolytic cell are likewise contemplated.

In another preferred embodiment, the surface layer includes a polymerized alkene which is substituted with a polynuclear aromatic structure. It is contemplated that such a polymerized alkene be substituted with atoms selected from the group comprising nitrogen, oxygen, sulfur and phosphorous.

Although the surface layer has been described as comprising various polymers, any polymer/copolymer which exhibits ionic conductivity, electronic conductivity and the ability to obtain chemical equilibrium between the surface layer and the anode, are contemplated for use.

In a preferred embodiment, the electrolytic cell comprises a rechargeable battery having a metal anode, a cathode, an electrolyte and means for substantially suppressing dendritic growth on the metal anode during electrodeposition. The means for substantially suppressing dendritic growth includes a surface layer applied to the metal anode. The surface layer includes means for enabling the transfer of ions from the metal anode to the electrolyte and back into contact with the metal anode, and, for providing electronic conductivity in the surface layer to, in turn, result in a substantially uniform attraction of metal ions back onto the metal anode during electrodeposition.

In this preferred embodiment of the invention, the rechargeable battery further comprises means for substantially obtaining chemical equilibrium between the surface layer and the metal anode. In addition, it is also preferred that the anode be substantially constructed from lithium.

The invention further comprises an electrolytic process comprising the steps of: a) connecting two electrodes separated and positioned within an electrolyte, wherein at least one of the two electrodes is an anode substantially constructed from an alkali metal and wherein the anode is at least partially coated with the surface layer; b) ionizing metal atoms from the alkali metal anode to provide alkali metal ions; c) transferring ions from the alkali metal anode through the surface layer and, in turn, to the electrolyte; d) conducting electrons in the surface layer; e) producing an electric field from the anode interface into the electrolyte; f) attracting alkali metal ions from the electrolyte back through the surface layer; and g) electrodepositing the alkali metal ions onto the alkali metal anode.

In a preferred embodiment of the process, the step of conducting electrons in the surface layer comprises the step of producing radical anions at an interface between the surface layer and the alkali metal anode. The surface layer may include a polymer comprising a polynuclear aromatic structure and the metal anode may comprise lithium. Accordingly, the step of conducting electrons in the surface layer comprises the step of producing radical anions upon contact between the polynuclear aromatic structure and the lithium anode.

In another preferred embodiment of the process, the surface layer includes an ion transferring polymer. The step of transferring ions from the alkali metal anode through the surface layer and into contact with the electrolyte comprises the step of complexing the ion transferring polymer with the alkali metal ions at the interface of the surface layer and the alkali metal anode.

In another preferred embodiment of the process, the electrolytic process further includes the step of obtaining substantial chemical equilibrium between the surface layer and the alkali metal anode.

DETAILED DESCRIPTION OF THE DRAWINGS

Figure 1:
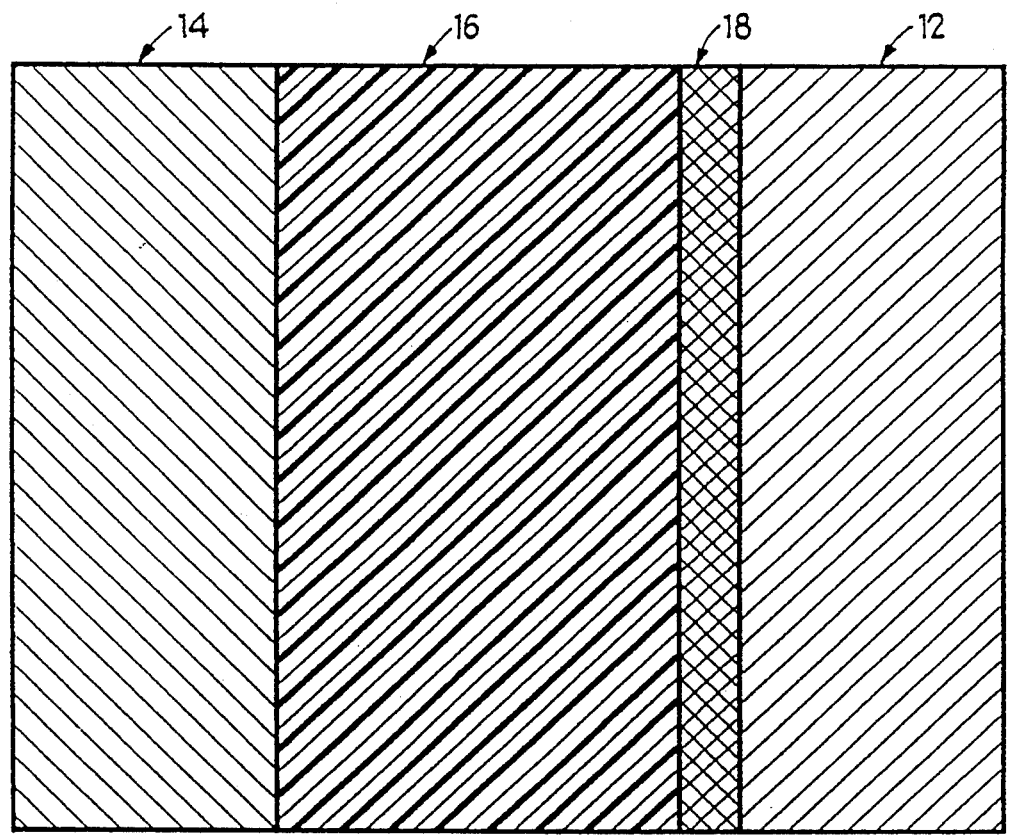
FIG. 1 is a diagram of the secondary electrolytic cell of the present invention.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Electrolytic cell 10 (which, in a preferred embodiment comprises a rechargeable battery) is shown in FIG. 1 as comprising anode 12, cathode 14, electrolyte 16 and surface layer 18. Although anode 12 will be described as being substantially constructed from lithium, it is contemplated that the anode be constructed from other alkali metals as well. In addition, it is likewise contemplated that electrolyte 16 comprise a liquid or solid electrolyte. Indeed, although detail will be provided on utilization of a liquid electrolyte composed of a one molal solution of $LiClO_4$ (lithium perchlorate) in $C_4H_6O_3$ (propylene carbonate), as well as a solid electrolyte based on $(-CH_2CH_2O-)_n$ poly(ethylene oxide) with an average molecular weight of 4,000,000 and $CF_3SO_3Li$ (lithium trifluoromethanesulfonate), it will be recognized to those with ordinary skill in the art that other liquid and solid electrolytes can be used relative to the particular electrode construction.

Surface layer 18 includes means for: 1) enabling transfer of ions from anode 12 to electrolyte 16, and then back into contact with the anode; 2) providing electronic conductivity in the surface layer 18; as well as 3) for obtaining substantial chemical equilibrium between surface layer 18 and anode 12, to, in turn, result in a substantially uniform distribution of metal ions back onto anode 12 during electrodeposition—thereby substantially suppressing dendrite growth on the anode. In a preferred embodiment, surface layer 18 comprises a copolymer of polyvinylnaphthalene and polyethylene oxide. As will be explained in greater detail, such a copolymer will exhibit ionic conductivity as a result of the polyethylene oxide, electronic conductivity due to the formation of naphthalene radical anions upon contact of the polyvinylnaphthalene with anode 12, and, chemical equilibrium between surface layer 18 and anode 12.

Although surface layer 18 may comprise polyvinylnapthalene and polyethylene oxide, it will be understood that other compounds which exhibit both ion and electronic conductivity are also contemplated for use. For example, it is contemplated that other polynuclear aromatic structures (other than naphthalene) be used for achieving the formation of radical anions upon contact with surface layer 18 of anode 12—toward obtaining the necessary electronic conductivity at the electrode/electrolyte interface.

Figure 2:
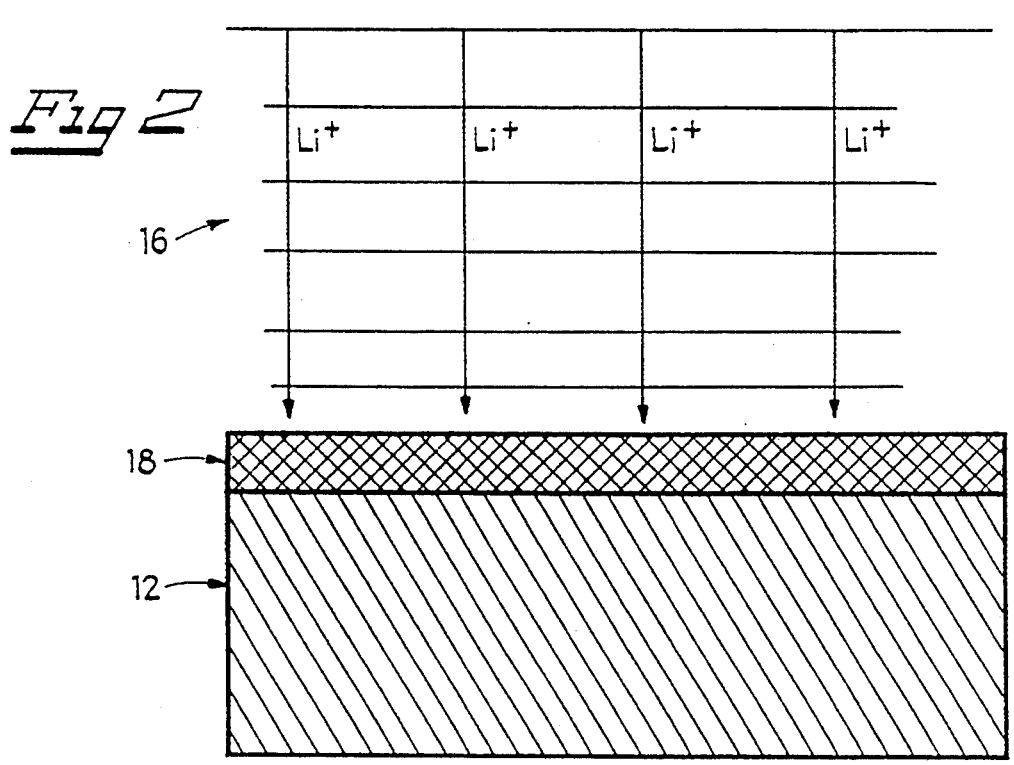
FIG. 2 is a sectional view of FIG. 1.

The electrolytic process is shown in FIG. 2 wherein lithium ions ($Li^+$) are permitted to pass from anode 12 toward and into electrolyte 16 (FIG. 1) due to the ionic conductivity of the surface layer. Furthermore, since surface layer 18 is electronically conductive (as a result of the formation of radical anions upon contact of the polynuclear aromatic structure with the metal anode), an electrical field, as shown in FIG. 2, is uniformally dispersed from the electrode/electrolyte interface toward and into electrolyte 16. Accordingly, during reduction, the lithium ions will be attracted back to, and through surface layer 18, and back onto anode 12 in a substantially uniform orientation—due to the relatively homogenous electrical field distributed at the electrode/electrolyte interface. As a result, dendrite growth will be substantially suppressed during such electrodeposition, and, in turn, the cycle life of the rechargeable battery will be greatly increased.

Inasmuch as the actual treatment of surface layer 18 onto anode 12 may be applied by any conventional technique, including but not limited to plasma and gas discharge polymerization (see for example, ORGANIC POLYMER COATING DEPOSITED FROM A GAS DISCHARGE, Ind, Eng. Chem. Prod. Res. Develop, Vol. 9, No. 1, March 1970 pgs 101–104), detail regarding such treatment will not be provided.

In support of the process and results of the above-identified exhibited characteristics of surface layer 18: namely, ionic conductivity, electronic conductivity and chemical equilibrium—all toward substantial suppression of dendrite growth on anode 12 during electrodeposition—several experiments were carried out using various surface treatments to the anode, as well as using both solid and liquid electrolytes. Accordingly, six of such experiments and their results are outlined hereinbelow.

At the outset, it should be noted that all six of the experiments utilized an electrolytic cell having the following common characteristics:

an aluminum foil of 11 $\mu m$ thick was pre-cleaned with acetone and then air dried at 60° C.;

a working electrode made with a 4.9 cm² piece of the above-identified aluminum foil;

a glass fiber separator;

a lithium metal reference electrode; and a lithium metal counter electrode.

Furthermore, in Experiments 1–4, the electrolyte comprised a liquid electrolyte composed of a 1 molal solution of $LiClO_4$ in propylene carbonate, while in Experiments 5 and 6 the electrolyte comprised a polymer based on poly(ethylene oxide) with an average molecular weight of 4,000,000, and lithium trifluoromethanesulfonate with an EO/Li ratio of 20:1.

EXPERIMENT NO. 1

In this experiment, the working electrode (with the aluminum foil) was not treated with any surface layers. Accordingly, the resistance of the electrochemical interface (between the surface of the aluminum foil and the electrolyte), as measured by AC impedance spectroscopy at room temperature, was very high, indicating the absence of an ionic conductive layer on the aluminum foil surface. Furthermore, the aluminum foil behaved like a blocking electrode which, in turn, prevented current flow until the voltage reached the value for lithium reduction.

EXPERIMENT NO. 2

In this experiment, a sample of the aluminum foil was mounted inside the vacuum chamber of a plasma polymerization reactor. The aluminum foil was then exposed to an argon plasma for five minutes under the following conditions:

pressure: 75 m Torr;

power: 120 W; and temperature: ambient.

Following the argon plasma treatment, the aluminum foil was then exposed to a methane plasma. The methane plasma was maintained for ten minutes under the following conditions:

pressure 100 m Torr;

power: 100 W; and temperature: ambient.

As observed through scanning electron microscopy, the methane plasma yielded a thin aliphatic polymer film on the aluminum surface at a thickness of approximately 1.32 μm. This methane plasma treated aluminum sample was then used as the working electrode in the electrolytic cell.

The resistance of the electrochemical interface formed between the working electrode and the electrolyte was then measured as a function of frequency and applied polarization voltage using AC impedance spectroscopy at room temperature. No changes in the value of the interfacial resistance were observed until the polarization voltage reached the value at which the lithium metal was plated on the aluminum foil.

The apparent conductivity of the interface formed by the aliphatic polymer film was evaluated, based on the thickness and resistance measurements, to be approximately $2.24 \times 10^{-7}$ S cm$^{-1}$ at room temperature. Although some ionic conductivity was observed in this experiment, further experimentation with a solid electrolyte revealed that such observed ionic conductivity was merely the result of the permeation of the liquid electrolyte through the porous aliphatic film on the aluminum foil.

EXPERIMENT NO. 3

In experiment No. 3, a sample of the aluminum foil was mounted inside the vacuum chamber of the plasma polymerization reactor. The aluminum foil was then exposed to an argon plasma for five minutes under the following conditions:

pressure: 80 m Torr;

power: 120 W;

temperature: ambient.

Following the argon plasma treatment, the aluminum foil was then exposed to a 2-vinylnapthalene/dioxane (VN-D) plasma for ten minutes under the following conditions:

pressure: 100 m Torr;

power: 60 W;

temperature: ambient.

During the plasma polymerization process, the VN-D yielded a surface layer on the aluminum foil of polyethylene oxide and polyvinylnaphthalene. The thickness of this copolymer surface layer was measured to be approximately 1.26 μm. The VN-D plasma treated aluminum foil on the working electrode was then utilized in the electrolytic cell.

The resistance of the electrochemical interface formed between the working electrode and the electrolyte was measured as a function of frequency and applied polarization voltage. No changes in the value of the interfacial resistance were observed until the polarization voltage reached the value of 0.3 volts versus $Li^+/Li^0$ (the reference electrode). At this voltage the lithium aluminum alloy formed.

Figure 3:
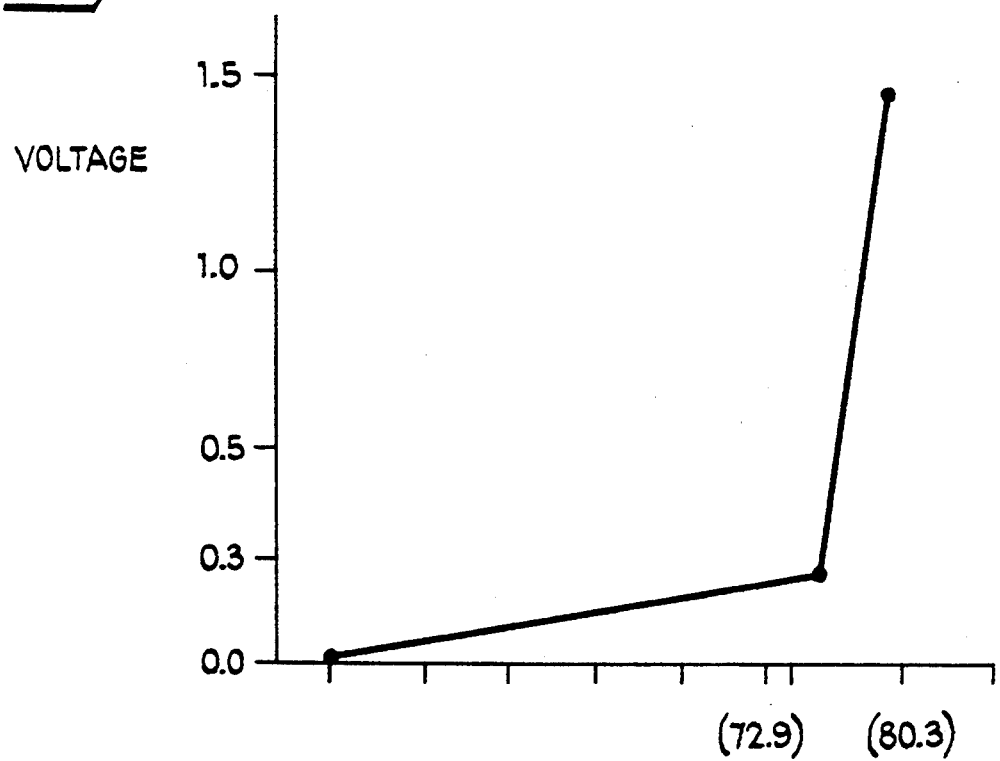
FIG. 3 is a graphic representation of results obtained in an experiment.

The ionic conductivity of the interface formed by the VN-D copolymer film was evaluated, based on thickness and resistance measurements to be approximately $3.43 \times 10^{-7}$ S cm$^{-1}$ at room temperature. As shown in FIG. 3, the resistance of the interface formed by the VN-D plasma polymerized copolymer changed significantly as the cathodic polarization voltage was increasingly applied.

The surface layer applied in this experiment exhibited all three desired results associated with the preferred embodiment of the invention: namely, ionic conductivity; electronic conductivity; and chemical equilibrium between the surface layer and the working electrode—thereby serving to substantially suppress dendrite growth during electrodeposition. Indeed, the electrolytic cell of Experiment No. 3 was charged and discharged for over 190 consecutive cycles with an apparent coulombic efficiency greater than 98%.

EXPERIMENT NO. 4

Experiment No. 4 was conducted in accordance with Experiment No. 3, with the exception of treating the interface of the aluminum foil with a dioxane (D) plasma in place of the VN-D treatment. Accordingly, the surface layer yielded from the (D) plasma treatment comprised polyethylene oxide—without the polynuclear aromatic structure otherwise yielded in the VN-D treatment.

The dioxane (D) plasma treatment was applied under the following conditions:

pressure: 80 m Torr;

power: 60 W;

treated time: 10 minutes temperature: ambient.

The thickness of the surface layer was measured to be 1.82 μpm.

The resistance of the interface formed between the working electrode and the electrolyte was measured as a function of frequency and applied polarization voltage. The value of the interfacial resistance changed when the polarization voltage reached 1.0 volts versus $Li^+/Li^0$ (the reference electrode). The conductivity of the interface formed by the surface layer on the aluminum surface was evaluated based on the thickness and resistance measurements to have a total ionic conductivity of approximately $6.44 \times 10^{-8}$ S cm$^{-1}$ at room temperature.

While the dioxane (D) plasma treated surface layer did indeed exhibit ionic conductivity, it was not capable of forming the radical anions necessary for the electronic conductivity in the surface layer.

EXPERIMENT NO. 5

As previously explained, the electrolyte was changed in Experiment Nos. 5 and 6 to a solid polymer based on polyethylene oxide with an average molecular weight of 4,000,000 and lithium trifluoromethane sulfunate (lithium triflate), with an EO/Li ratio of 20:1. In Experiment No. 5, the electrolytic cell was assembled in accordance with Experiment No. 3—other than with respect to the electrolyte. This cell included the use of aluminum foil, treated with VND plasma as the working electrode.

The interfacial resistance was measured as a function of frequency and applied polarization voltage by AC impedance at 115° C. As experienced in Experiment No. 3, no changes in the value of interfacial resistance were observed until the polarization voltage reached the value of 0.3 volts versus $Li^+/Li^0$. At that voltage the lithium aluminum alloy was formed.

Figure 4:
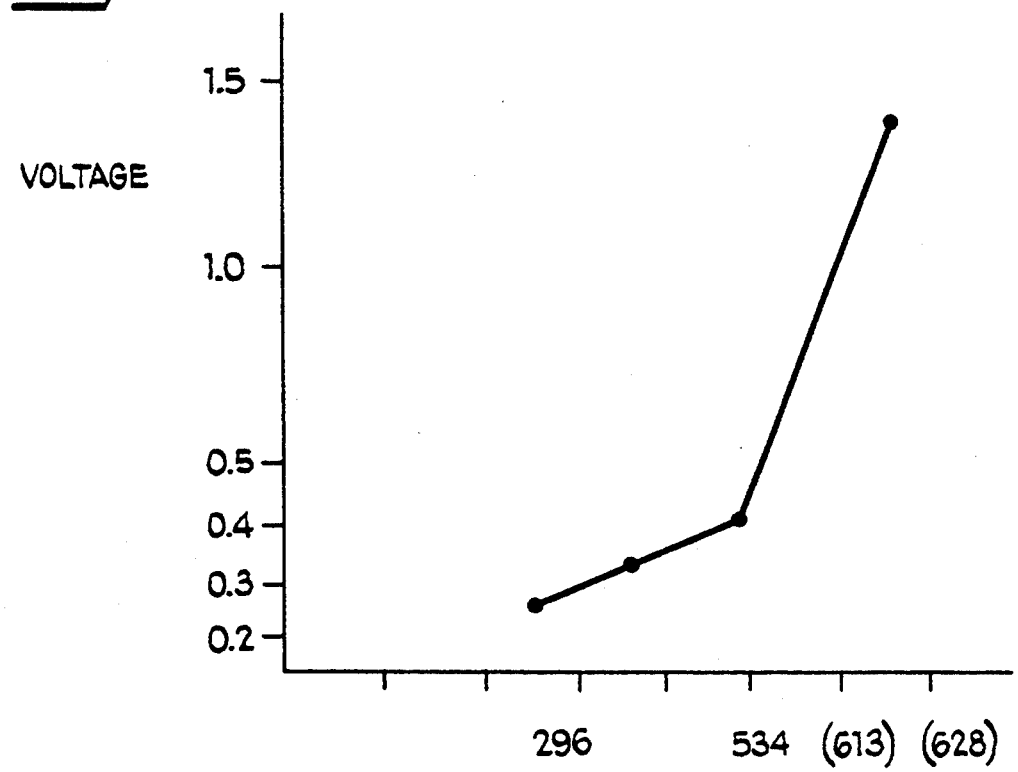
FIG. 4 is a graphic representation of results obtained in another experiment.

FIG. 4 depicts the applied voltages and the associated resistance prior to and after reaching the required voltage for forming the lithium aluminum alloy Experiment No. 5, like Experiment No. 3, revealed that the surface layer applied to the aluminum foil also exhibited ion conductivity, electronic conductivity and chemical equilibrium between the surface layer and the anode—even though a solid electrolyte was utilized. However, unlike the liquid electrolyte, the relatively high molecular weight of the solid electrolyte substantially precluded permeation of the electrolyte through the surface coating applied by the VN-D plasma treatment.

EXPERIMENT NO. 6

In Experiment No. 6, the electrolytic cell of Experiment No. 5 was assembled. However, instead of using the VN-D plasma treated aluminum foil, the aluminum was methane plasma treated to, in turn, yield an aliphatic polymer film thereon.

The electrode-electrolyte interfacial resistance was then measured as a function of frequency and applied polarization voltage by AC impedance at 100° C. The interfacial resistance was so high that no significant electrochemical reaction at the anode could be detected.

As previously explained, and as exhibited in Experiment Nos. 3, 4 and 5, the identified electrolytic cell (battery) 10 (FIG. 1) and associated process (recharging) reflected a substantial increase in the cell's cycle life when the working electrode was treated with a surface layer exhibiting ionic conductivity, electronic conductivity and chemical equilibrium between the surface layer and anode. Indeed, tho uniform electrical field created, as well as the natural complexing of the particular metal ions (e.g., $Li^+$) has been shown to substantially suppress dendrite growth on the anode/electrode during electrodeposition.

Furthermore, while a preferred embodiment has been explained with respect to the surface layer being applied to the anode, it will be understood that such a surface layer, with the same results, can be applied to other anode and cathode material as well.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. An electrolytic cell comprising:
    an anode having an interface, a cathode and an electrolyte;
    a surface layer applied to the interface of the anode, wherein the surface layer is constructed from a material which is in an initial state of substantial chemical equilibrium with the anode
    the surface layer having
        means for enabling transfer of ions from the anode to the electrolyte and back into contact with the anode, and, means for providing electronic conductivity in the surface layer upon formation of dendritic growth on the interface, to, in turn, substantially suppress the dendritic growth, so as to result in a substantially uniform distribution of metal ions back onto the anode during electrodeposition,
    the surface layer returning to its initial state of substantial chemical equilibrium after the substantial suppression of the dendritic growth.

2. The electrolytic cell according to claim 1 wherein the anode is substantially constructed from an alkali metal.

3. The electrolytic cell according to claim 2 wherein the anode is lithium.

4. The electrolytic cell according to claim 2 wherein the surface layer includes a polymer comprising a polynuclear aromatic structure.

5. The electrolytic cell accordingly to claim 4 wherein the polynuclear aromatic structure comprises vinylnaphthalene.

6. The electrolytic cell according to claim 2 wherein the surface layer includes a polymerized alkene which is substituted with a polynuclear aromatic structure.

7. The electrolytic cell according to claim 1 wherein the surface layer includes a polymerized alkene which is substituted with atoms selected from the group comprising nitrogen, oxygen, sulfur and phosphorus.

8. The electrolytic cell according to claim 1 wherein the surface layer includes polyethylene oxide.

9. The electrolytic cell according to claim 1 wherein the surface layer comprises a copolymer of an alkene monomer substituted with a polynuclear aromatic structure and an alkene monomer substituted with atoms selected from the group of nitrogen, oxygen, sulfur and phosphorus.

10. An electrolytic cell comprising:
    an anode having an interface, a cathode and an electrolyte; and
    a surface layer applied to the interface of the anode, the surface layer including a copolymer which enables transfer of ions from the anode to the electrolyte and back into operable contact with the anode, and, which becomes electronically conductive upon formation of dendritic growth at the interface.

11. The invention according to claim 10 wherein the anode is lithium, and the surface layer comprises a copolymer of polyvinylnaphthalene and polyethylene oxide.

12. A rechargeable battery comprising:
a metal anode having an interface, a cathode and an electrolyte;
means for substantially suppressing dendritic growth on the interface of the metal anode during electrodeposition,
the means for substantially suppressing dendritic growth including a surface layer applied to the interface of the metal anode, wherein the surface layer is constructed from a material which is in an initial state of substantial chemical equilibrium with the metal anode,
the surface layer having
means for enabling transfer of ions from the metal anode to the electrolyte and back into operable contact with the metal anode, and, means for providing electronic conductivity in the surface layer upon formation of dendritic growth on the interface to, in turn, substantially suppress the dendritic growth, so as to result in a substantially uniform attraction of metal ions back onto the metal anode during electrodeposition,
the surface layer returning to its initial state of substantial chemical equilibrium after the substantial suppression of the dendritic growth.

13. The rechargeable battery according to claim 12 wherein the metal anode is constructed from an alkali metal.

14. The rechargeable battery according to claim 12 wherein the surface layer includes a polymer comprising a polynuclear aromatic structure.

15. The rechargeable battery according to claim 12 wherein the surface layer includes a polymerized alkene which is substituted with atoms selected from the group comprising nitrogen, oxygen, sulfur and phosphorous.

16. The rechargeable battery according to claim 12 wherein the surface layer comprises a copolymer of an alkene monomer substituted with a polynuclear aromatic structure and an alkene monomer substituted with atoms from the group comprising nitrogen, oxygen, sulfur and phosphorous.

17. An electrolytic process comprising the steps of:
connecting two electrodes separated and positioned within an electrolyte,
at least one of the two electrodes being an anode substantially constructed from an alkali metal and wherein the anode is at least partially coated with a surface layer;
producing an electric field from the anode interface into the electrolyte;
attracting alkali metal ions from the anode interface and through the surface layer;
electrodepositing the alkali metal ions onto the alkali metal anode;
conducting electrons in the surface layer upon formation of radical anions at an interface between the surface layer and the alkali metal anode upon formation of dendritic growth;
maintaining the conductivity of electrons until the dendritic growth is substantially suppressed;
returning the surface layer to a state of substantial chemical equilibrium after dendritic growth has been substantially suppressed.

18. The electrolytic process according to claim 17 wherein the surface layer includes a polymer comprising a polynuclear aromatic structure;
the step of conducting electrons in the surface layer comprises the step of producing radical anions upon contact between the polynuclear aromatic structure and the dendritic growth on the alkali metal anode.

19. The electrolytic process according to claim 17 wherein the surface layer includes an ion transferring polymer; the process further comprising
the step of transferring ions from the alkali metal anode through the surface layer and into operable contact with the electrolyte wherein said step of transferring ions comprises complexing the ion transferring polymer with the alkali metal anode ions at the interface of the surface layer and the alkali metal anode.

20. The electrolytic process according to claim 17 wherein the alkali metal anode is lithium.

* * * * *

UNITED STATES PATENT AND TRADEMARK OFFICE
CERTIFICATE OF CORRECTION

PATENT NO. : 5,434,021
DATED : July 18, 1995
INVENTOR(S) : Fauteux et al.

It is certified that error appears in the above-indentified patent and that said Letters Patent is hereby corrected as shown below:

Col. 1, line 4      After the title and before the Background insert -- The invention was made with Government support under contract number 93-F151600-000 awarded by the Central Intelligence Agency --.

Signed and Sealed this

Fifth Day of August, 1997

Attest:

BRUCE LEHMAN

Attesting Officer      Commissioner of Patents and Trademarks